(12) United States Patent
Lee et al.

(10) Patent No.: US 8,939,717 B1
(45) Date of Patent: *Jan. 27, 2015

(54) VANE OUTER SUPPORT RING WITH NO FORWARD HOOK IN A COMPRESSOR SECTION OF A GAS TURBINE ENGINE

(71) Applicants: Ching-Pang Lee, Cincinnati, OH (US); Mrinal Munshi, Orlando, FL (US); Adam C. Pela, Jupiter, FL (US); Paul Bradley Davis, Stuart, FL (US); Matthew H. Lang, Orlando, FL (US)

(72) Inventors: Ching-Pang Lee, Cincinnati, OH (US); Mrinal Munshi, Orlando, FL (US); Adam C. Pela, Jupiter, FL (US); Paul Bradley Davis, Stuart, FL (US); Matthew H. Lang, Orlando, FL (US)

(73) Assignee: Siemens Aktiengesellschaft, München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/063,153

(22) Filed: Oct. 25, 2013

(51) Int. Cl.
*F01D 9/04* (2006.01)
*F01D 25/24* (2006.01)
*B23P 6/00* (2006.01)

(52) U.S. Cl.
CPC .............. *F01D 25/246* (2013.01); *B23P 6/005* (2013.01); *F01D 9/042* (2013.01)
USPC ...................... 415/182.1; 415/209.2

(58) Field of Classification Search
CPC ...... F01D 25/246; F01D 5/025; F01D 5/3038
USPC ............... 415/170.1, 173.1, 189, 190, 209.2, 415/209.3, 209.4, 213.1, 214.1, 182.1; 416/194, 195, 196 R
See application file for complete search history.

(56) References Cited

U.S. PATENT DOCUMENTS

| | | | | |
|---|---|---|---|---|
| 2,980,396 | A * | 4/1961 | Movsesian | 415/189 |
| 3,326,523 | A | 6/1967 | Bobo | |
| 3,628,880 | A * | 12/1971 | Smuland et al. | 415/175 |
| 4,014,627 | A | 3/1977 | Heurteux | |
| 4,897,021 | A | 1/1990 | Chaplin et al. | |
| 4,920,742 | A * | 5/1990 | Nash et al. | 60/799 |
| 5,429,479 | A | 7/1995 | Cordier | |
| 6,969,239 | B2 * | 11/2005 | Grant et al. | 416/220 R |
| 7,448,849 | B1 * | 11/2008 | Webster et al. | 415/173.1 |
| 7,762,766 | B2 * | 7/2010 | Shteyman et al. | 415/190 |
| 8,038,389 | B2 * | 10/2011 | Arness et al. | 415/190 |
| 8,070,429 | B2 * | 12/2011 | Burdgick et al. | 415/191 |
| 8,128,354 | B2 * | 3/2012 | Hansen et al. | 415/191 |
| 8,206,094 | B2 | 6/2012 | Seki et al. | |

OTHER PUBLICATIONS

D. Sundaravadivel et al.; Mitsubishi's upgraded 50 Hz F class Gas turbine for high efficiency; Mitsubishi Power Systems India PVT, LTD.; pp. 1-22; Feb. 2012.

* cited by examiner

*Primary Examiner* — Ned Landrum
*Assistant Examiner* — Ryan Ellis

(57) ABSTRACT

A support ring for a row of vanes in an engine section of a gas turbine engine includes an annular main body portion to which a row of vanes is affixed for providing structural support for the vanes in the engine section, and an aft hook extending from an aft side of the main body portion with reference to a direction of air flow through the engine section. The aft hook is coupled to an outer engine casing for structurally supporting the support ring in the engine section. The support ring does not include a forward hook having a flange that extends axially from a forward or aft side of the forward hook with reference to the direction of air flow through the engine section.

15 Claims, 4 Drawing Sheets

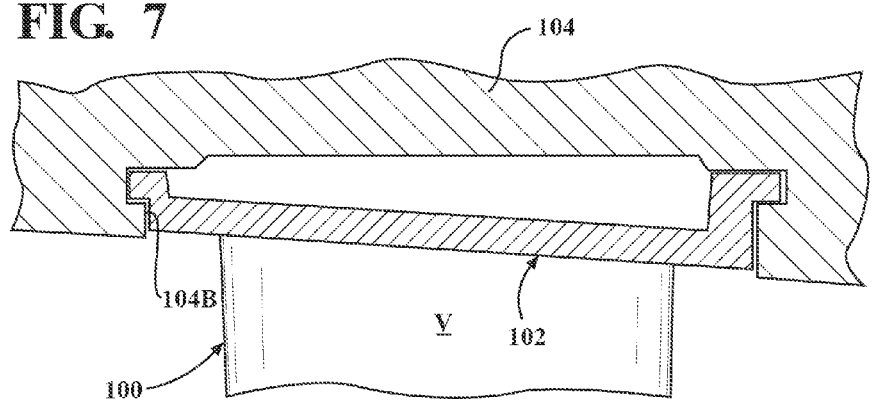
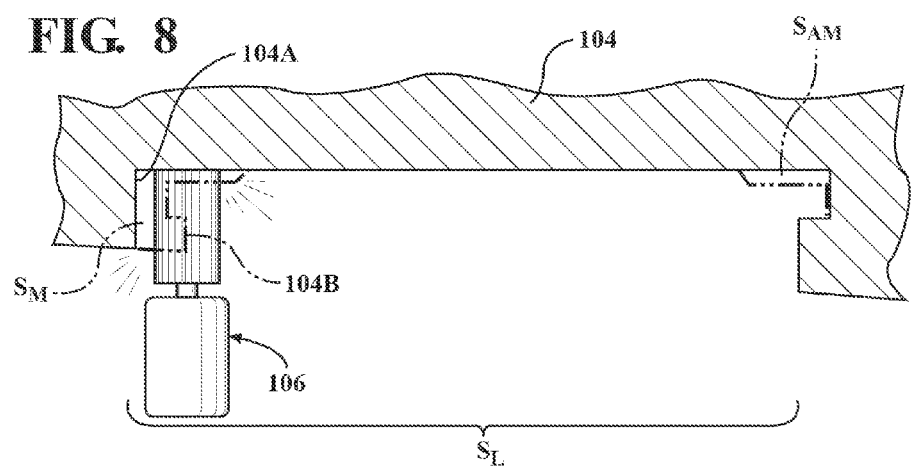
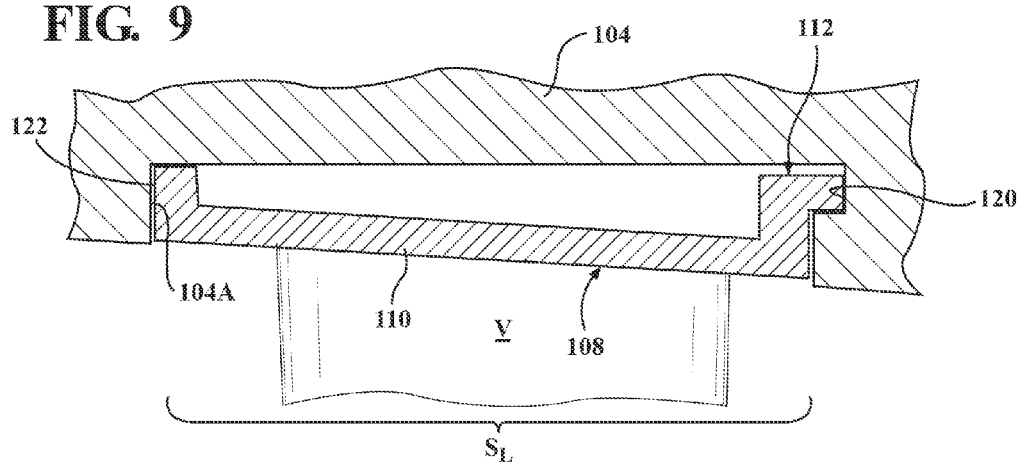

VANE OUTER SUPPORT RING WITH NO FORWARD HOOK IN A COMPRESSOR SECTION OF A GAS TURBINE ENGINE

FIELD OF THE INVENTION

The present invention relates to a support ring for a row of vanes in a compressor section of a gas turbine engine, and more particularly, to an outer support ring that includes no forward hook affixed to an engine casing.

BACKGROUND OF THE INVENTION

In gas turbine engines, air is drawn into a compressor section where it is compressed and routed to a combustion section. The compressed air is burned with a fuel in the combustion section, creating combustion products defining a high temperature working gas. The working gas is directed through a hot gas path in a turbine section of the engine, where the working gas expands to provide rotation of a turbine rotor. The turbine rotor may be linked to an electric generator, wherein the rotation of the turbine rotor may be used to produce electricity in the generator.

SUMMARY OF THE INVENTION

In accordance with a first aspect of the present invention, a support ring is provided for a row of vanes in an engine section of a gas turbine engine including a central axis defining an axial direction. The support ring comprises an annular main body portion to which the vanes are affixed for providing structural support for the vanes in the engine section, and an aft hook extending from an aft side of the main body portion with reference to a direction of air flow through the engine section. The aft hook is coupled to an outer engine casing for structurally supporting the support ring in the engine section. The support ring does not include a forward hook having a flange that extends axially from a forward or aft side of the forward hook with reference to the direction of air flow through the engine section.

In accordance with a second aspect of the present invention, a method is provided for servicing a compressor section of a gas turbine engine where an aged support ring and corresponding vanes have been removed from a servicing location of an outer engine casing. Select material is removed from the servicing location of the outer engine casing such that a replacement support ring not having a forward hook can be installed in the servicing location in the place of the aged support ring. The replacement support ring is installed in the servicing location by securing an aft hook of the replacement support to the outer casing, wherein the aft hook supports the support ring from the outer engine casing.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIGS. 7-9 are views similar to FIG. 2 depicting exemplary steps of a servicing procedure for a gas turbine engine in accordance with another embodiment of the invention.

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
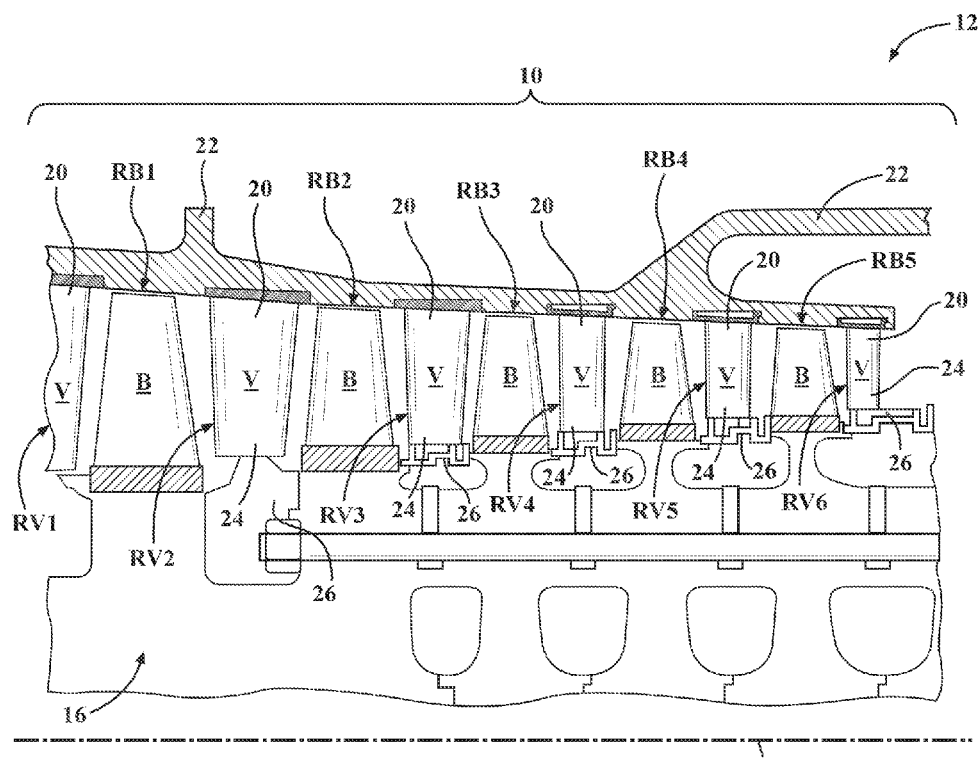
FIG. 1 is a schematic sectional view of a portion of a compressor section in a gas turbine engine, the compressor section including a plurality of rows of vanes supported from an engine casing via support rings constructed in accordance with an embodiment of the present invention.

Referring now to FIG. 1, a portion of an engine section, and, more specifically, a compressor section 10 of a gas turbine engine 12 is illustrated. The illustrated portion of the compressor section 10 includes six rows RV1-6 of stationary compressor vanes V and five rows RB1-5 of rotating compressor blades B. It is understood that the compressor section 10 may include additional or fewer rows of vanes V and blades B than as shown in FIG. 1 without departing from the scope and spirit of the invention.

As will be apparent to those having ordinary skill in the art, air is drawn into the engine 12 through the compressor section 10, wherein the rows RV1-6, RB1-5 of vanes V and blades B function to compress the air in a known manner. The compressed air is supplied to a combustion section (not shown) downstream from the compressor section 10 where the compressed air is mixed with fuel and ignited to create hot working gases. The hot working gases are conveyed to a turbine section (not shown) where they are used to provide rotation to a rotor in a known manner. A portion 16 of the rotor (hereinafter "rotor portion 16") that extends through the compressor section 10 is illustrated in FIG. 1. The rotor may be used to power an electric generator for the production of electricity in a known manner. The rotor portion 16 extends parallel to a central axis $C_A$ of the engine 12, which central axis $C_A$ in defines an axial direction $A_D$ of the engine 12.

As shown in FIG. 1, the rows RV1-6 of vanes V are suspended at outer ends 20 thereof from an outer engine casing 22, which will be described in greater detail below. The rows RV1-6 of vanes V are also supported at inner ends 24 thereof on respective inner shrouds 26.

Figure 2:
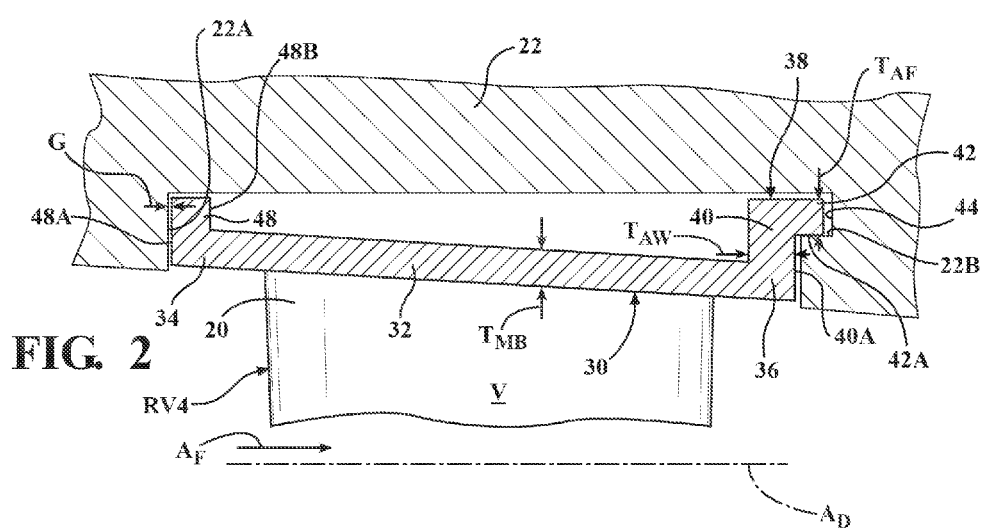
FIG. 2 is an enlarged view of one of the support rings illustrated in FIG. 1.

Referring now to FIG. 2, the connection of one of the rows RV1-6 of vanes V to the outer engine casing 22 is shown. It is contemplated that row of vanes V illustrated in FIG. 2 may be the fourth row RV4 of vanes V in the compressor section 10, although the illustrated row of vanes V could also be the fifth or sixth row RV5, RV6 of vanes V.

The exemplary fourth row RV4 of vanes V shown in FIG. 2 is supported to the outer engine casing 22 via a support ring 30. The support ring 30 includes an annular main body portion 32 to which the vanes V are affixed for providing structural support for the vanes V. The main body portion 32 extends generally in the axial direction $A_D$ with a slight radially inward tilt from a forward side 34 thereof to an aft side 36 thereof with reference to a direction of air flow $A_F$ through the compressor section 10. The slight radially inward tilt of the main body portion 32 corresponds to the radially inward taper of the compressor section 10 from left to right as shown in FIG. 1. The main body portion 32 may have a thickness $T_{MB}$ of about 4 mm to about 13 mm. It is noted that the support ring 30 may be formed from a plurality of circumferentially extending sections or pieces that are joined together, such as, for example, by welding. The size and number of sections may vary depending on the size and configuration of the engine 12.

The support ring 30 further comprises an aft hook 38 extending from the aft side 36 of the main body portion 32. The aft hook 38 is coupled to the outer engine casing 22 for structurally supporting the support ring 30, and, thus, the vanes V in the compressor section 10. Specifically, the aft hook 38 of the illustrated support ring 30 comprises an aft wall 40 that extends generally radially outwardly from the main body portion 32 and an aft flange 42 that extends generally axially from an aft side 40A of the aft wall 40, wherein the aft flange 42 is received in a corresponding groove 44 formed in the outer engine casing 22. The aft wall 40 may have a thickness $T_{AW}$ of about 4 mm to about 15 mm, and the aft flange 42 may have a thickness $T_{AF}$ of about 4 mm to about 9 mm. In accordance with one aspect of the invention, the thickness $T_{AW}$ of the aft wall 40 may be about the same or slightly greater than the thickness $T_{MB}$ of the main body portion 32, and the thickness $T_{AF}$ of the aft flange 42 may be about the same or slightly less than the thickness $T_{MB}$ of the main body portion 32. The thicknesses $T_{AW}$, $T_{AF}$ of the aft wall 40 and aft flange 42 of the aft hook 38 are preferably enlarged when compared with prior art aft flanges, as will be discussed below.

Figure 6:
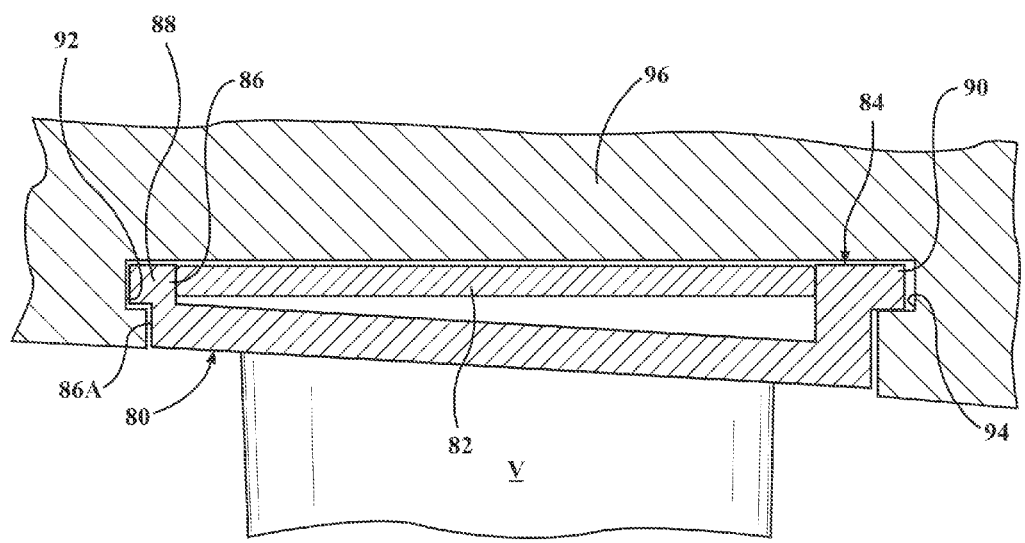
FIG. 6 is a view similar to the view of FIG. 2 and showing a support ring for a row of vanes in accordance with another embodiment of the invention.

Referring still to FIG. 2, the support ring 30 additionally comprises a forward wall 48 that extends generally radially outwardly from the forward side 34 of the main body portion 32. In accordance with an aspect of the present invention, the support ring 30 illustrated in FIG. 2 does not have a forward hook or flange that extends axially from either a forward side 48A or aft side 48B of the forward wall 48 (exemplary forward flanges are shown in the embodiments of FIGS. 6 and 7, which will be discussed below). Hence, a radially inwardly facing surface 42A of the aft flange 42 of the aft hook 38 is the sole structure of the support ring 30 that is supported by a radially outwardly facing surface of structure of or affixed to the outer engine casing 22, such as a surface of the outer engine casing 22 itself, or a structure mechanically affixed to the outer engine casing, such as a bolt or screw i.e., the surface 42A is supported by a radially outwardly facing surface 22B of the outer engine casing 22 within the groove 44, such that the aft hook 38 is the main structure that supports the support ring 30 from the outer engine casing 22 during non-operational conditions. During operation of the engine, the aft hook 38 provides a majority of the circumferential structural support for the support ring 30 and the corresponding vanes V from the outer engine casing 22, while the forward wall 48 provides a majority of the axial support for the support ring 30 and the corresponding vanes V due to its engagement with a radially extending and axially facing wall surface 22A of the outer engine casing 22.

It is noted that a small gap G exists in FIG. 2 between the forward side 48A of the forward wall 48 and the wall surface 22A of the outer engine casing 22, as FIG. 2 depicts these components in a cold or non-operational state. During operation of the engine, thermal growth of one or both of the support ring 30 and the outer engine casing 22 and/or relative movement between these components causes the gap G to shrink and be depleted, wherein the forward side 48A of the forward wall 48 comes into contact with the wall surface 22A of the outer engine casing 22 to provide the axial support for the support ring 30 and the corresponding vanes V as noted above. Such contact between the forward side 48A of the forward wall 48 with the wall surface 22A of the outer engine casing 22 results in an increased area of engagement at the forward end 34 of the support ring 30 over prior art support ring configurations having a forward hook or flange that extends axially from the forward 48A side of the forward wall 48. The increased area of engagement at the forward end 34 of the support ring 30 is believed to reduce the wear at the forward end 34 of the support ring 30, i.e., between the forward wall 48 and the wall surface 22A of the outer engine casing 22, thus increasing a lifespan of the support ring 30.

In accordance with this aspect of the present invention, the enlarging of the aft hook 38 results in an increased area of engagement between the lower surface 42A of the aft flange 42 of the aft hook 38 and a corresponding radially outwardly facing surface 22B within the groove 44 of the outer engine casing 22 to provide a greater amount of structural support for the support ring 30, which is preferable since the support ring 30 of this embodiment lacks a forward hook or flange extending from the forward wall 48 of the support ring 30. By eliminating a forward hook/flange, a reduction in contact pressure at the forward side 34 of the main body portion 32 is believed to be effected during non-operational conditions, while, during operation, the increased area of engagement at the forward end 34 of the support ring 30, i.e., between the forward side 48A of the forward wall 48 and the wall surface 22A of the outer engine casing 22, is increased so as to increase a lifespan of these components as noted above.

Figure 3:
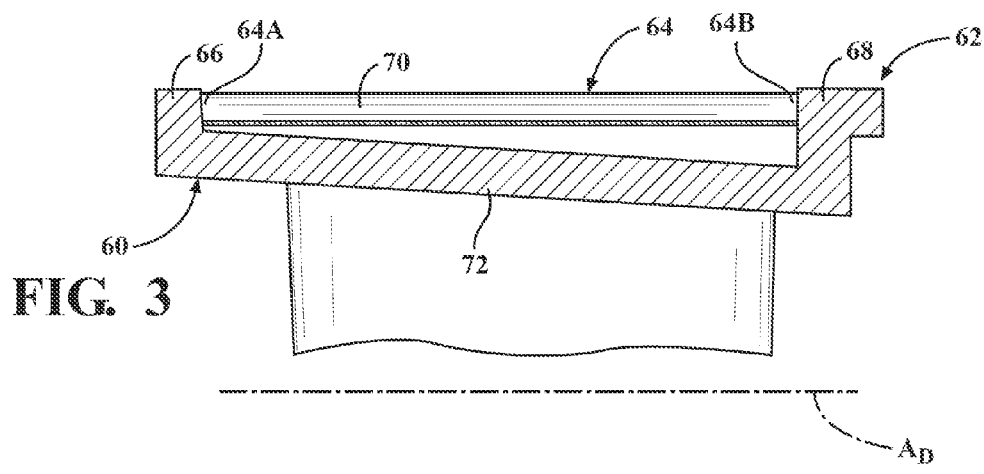
FIG. 3 is a view similar to the view of FIG. 2 taken along line 3-3 in FIG. 4 and showing a support ring for a row of vanes in accordance with another embodiment of the invention.
Figure 4:
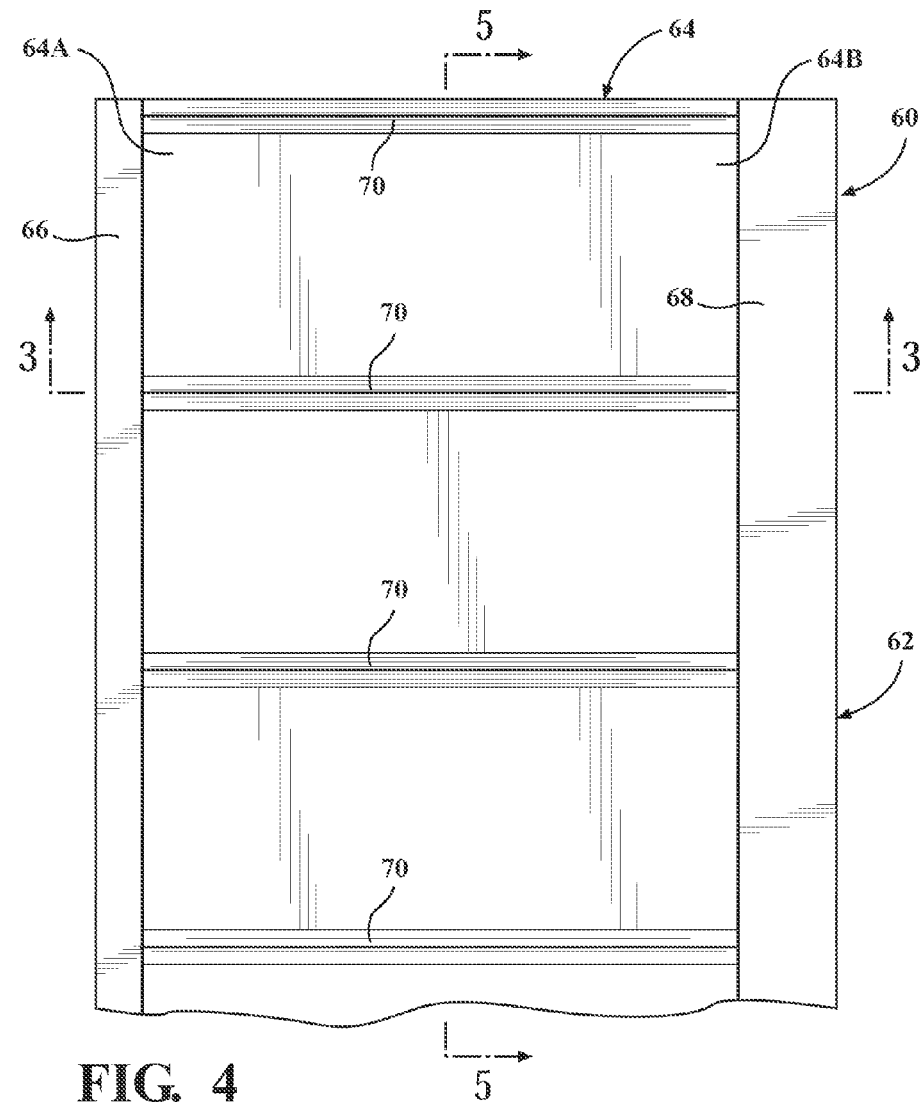
FIG. 4 is a cross sectional view of the support ring shown in FIG. 3.
Figure 5:
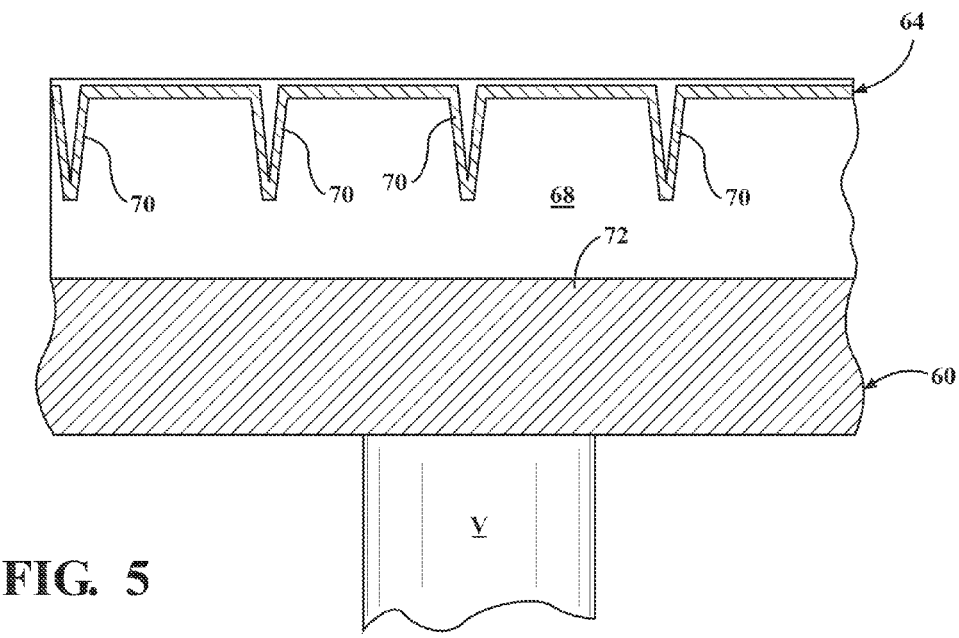
FIG. 5 is an enlarged cross sectional view taken along line 5-5 in FIG. 4.

Referring now to FIGS. 3-5, a support ring 60 formed in accordance with another aspect of the invention is shown. In this embodiment, in addition to the support ring 60 including an enlarged aft hook 62 and no forward hook or axially extending flange as described above with reference to the embodiment illustrated in FIG. 2, the support ring 60 of this embodiment includes a strong back plate 64 that spans between forward and aft walls 66, 68 of the support ring 60, wherein the aft wall 68 defines part of the aft hook 62. The strong back plate 64 may be, for example, bolted or welded in place, and effects a reduction in dynamic displacement between the forward and aft walls 66, 68 of the support ring 60 during operation of the engine.

As shown most clearly in FIGS. 4 and 5, the exemplary strong back plate 64 according to this aspect of the invention includes a plurality of circumferentially spaced apart corrugations 70 that extend radially inwardly toward a main body portion 72 of the support ring 60. The corrugations 70 extend from a forward edge of the strong back plate 64 located at a forward end 64A of the strong back plate 64, which is proximate to and affixed to the forward wall 66 of the support ring 60, to an aft edge of the strong back plate 64 located at an aft end 64B of the strong back plate 64, which is proximate to and affixed to the aft hook 62 of the support ring 60. The corrugations 70 increase a structural rigidity of the strong back plate 64 in the axial direction $A_D$ while providing controlled displacement in the radial direction to reduce stress.

Referring now to FIG. 6, a support ring 80 formed in accordance with yet another aspect of the invention is shown. In this embodiment, in addition to the support ring 80 including a strong back plate 82 and, optionally, an enlarged aft hook 84, the support ring 80 of this embodiment includes a forward wall 86 and a flange 88 that extends axially from a forward side 86A of the forward wall 86. The flange 88 and a flange 90 of the aft hook 84 according to this embodiment of the invention are each received in corresponding grooves 92, 94 of an outer engine casing 96 to cooperatively support the support ring 80 and vanes V in the engine. The strong back plate 82 according to this aspect of the invention may comprise a solid plate-like member, or it may include corrugations similar to the corrugations 70 described above for the embodiment of FIGS. 3-5. Additionally, the strong back plate 64 illustrated in FIGS. 3-5, which includes the corrugations 70, could be replaced with the solid plate-like member strong back plate 82 of FIG. 6.

With reference now to FIGS. 7-9, exemplary steps of a method for servicing a compressor section of a gas turbine engine are illustrated. In FIG. 7, an existing row 100 of vanes V and an aged support ring 102 are removed from an outer engine casing 104. This may be done using conventional techniques, although it is noted that the vanes V are preferably not destroyed or harmed such that they can be reused upon installation of a replacement support ring as will be described herein (assuming the vanes V are in good enough condition to warrant placement back into the engine).

As shown in FIG. 8, a machine 106 is used to remove select material $S_M$ from a servicing location $S_L$ of the outer engine casing 104. Specifically, a replacement support ring 108 (see FIG. 9), which is to be inserted into the servicing location $S_L$ where the aged support ring 102 was located, does not include a forward hook, such that the replacement support ring 108 is similar to the support ring 30 of FIG. 2 or the support ring 60 of FIGS. 3-5. However, a main body portion 110 of the replacement support ring 108 is axially longer than the aged support ring 102, such that the select material $S_M$ has to be removed from the servicing location $S_L$ of the outer engine casing 104 for the outer engine casing 104 to be capable of receiving and supporting the replacement support ring 108. As shown in FIG. 8, the machine 106 removes the select material $S_M$ from the servicing location $S_L$ such that the outer engine casing 104 has a generally radially extending and axially facing wall surface 104A with no slot or groove, i.e., since the replacement support ring 108 does not include a forward hook with an axially extending flange to be inserted into such a slot or groove.

Further, the machine 106 may also remove additional select material $S_{AM}$ (see FIG. 8) from a rear portion of the servicing location $S_L$, as the replacement support ring 108 may have an enlarged aft hook 112 as with the support ring 30 of FIG. 2 or the support ring 60 of FIGS. 3-5. The additional select material $S_{AM}$ is removed if the replacement support ring 108 has an enlarged aft hook 112 such that the outer engine casing 104 is capable of receiving and supporting the replacement support ring 108.

Once the engine casing 104 is machined to specification, i.e., after the select material $S_M$ has been removed from the servicing location $S_L$ of the engine casing 104 and optionally after the machine 106 has removed the additional select material $S_{AM}$ (if the replacement support ring 108 has an enlarged aft hook 112), such that the engine casing 104 can receive the replacement support ring 108, the radially extending and axially facing wall surface 104A of the engine casing 104 will be axially spaced from a radially extending and axially facing wall surface 104B of the engine casing 104 at the servicing location $S_L$ before the select material $S_M$ was removed from the engine casing 104, see FIGS. 8 and 9.

The replacement support ring 108 and vanes V are then installed into the engine and secured to the outer engine casing 104, wherein the aft hook 112 (which may be enlarged as described above) of the replacement support ring 108 is slid into a groove 120 formed in the outer engine casing 104 and is essentially the sole structure that supports the replacement support ring 108 from the outer engine casing 104 as described herein. Also as noted above, while new replacement vanes V could be used, the vanes V removed from the engine as described above with reference to FIG. 7 could be used again (assuming the vanes V are in good enough condition to warrant placement back into the engine).

As discussed above with reference to FIG. 2, areas of engagement between a forward side 122 of the replacement support ring 108 and the wall surface 104A of the outer engine casing 104, and between the aft hook 112 and the groove 120 formed in the outer engine casing 104 are enlarged, such that a service life of these components is believed to be increased. Further, these increased areas of engagement are effected without a substantial increase in the overall axial length of the replacement support ring 108, such that the same number of rows of vanes V and blades B within the compressor section can be conserved.

The servicing method described above could be implemented with or without a rotor being in place in the engine, e.g., the rotor portion 16 as described above. Further, the servicing method could be used for a support ring having a strong back plate as described above with reference to FIGS. 3-5, or for a support ring without a strong back plate, as described above with reference to FIGS. 1 and 2.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A support ring for a row of vanes in an engine section of a gas turbine engine including a central axis defining an axial direction, the support ring comprising:
   an annular main body portion to which the vanes are affixed for providing structural support for the vanes in the engine section; and
   an aft hook extending from an aft side of the main body portion with reference to a direction of air flow through the engine section, the aft hook coupled to an outer engine casing for structurally supporting the support ring in the engine section;
   wherein the support ring does not include a flange that extends axially from a forward side of the main body portion with reference to the direction of air flow through the engine section; and
   a strong back plate spanning between forward and aft walls of the support ring, the strong back plate effecting a reduction in dynamic displacement between the forward and aft walls during operation of the engine, wherein the strong back plate includes a plurality of circumferentially spaced apart corrugations spanning between the forward and aft walls of the support ring from a forward edge of the strong back plate to an aft edge of the strong back plate, the corrugations extending radially toward the main body portion and increasing a structural rigidity of the strong back plate in the axial direction while providing controlled displacement in the radial direction to reduce stress;
   wherein a radially inwardly facing surface of an aft flange extending axially from the aft hook is the sole structure of the support ring that is supported by a radially outwardly facing surface of structure of the outer engine casing or structure affixed to the outer engine casing.

2. The support ring of claim 1, wherein the aft hook comprises the aft wall, which extends generally radially outwardly from the main body portion and the aft flange extends generally axially from an aft side of the aft wall.

3. The support ring of claim 2, wherein the aft flange is received in a corresponding groove formed in the outer engine casing.

4. The support ring of claim 3, wherein the forward wall extends generally radially outwardly from the forward side of the main body portion.

5. The support ring of claim 1, wherein the corrugations extend continuously from the forward edge of the strong back plate to the aft edge of the strong back plate.

6. The support ring of claim 1, wherein the engine section is a compressor section.

7. The support ring of claim 1, wherein the support ring is formed from a plurality circumferentially extending sections that are joined together.

8. A method for servicing a compressor section of a gas turbine engine where an aged support ring and corresponding vanes have been removed from a servicing location of an outer engine casing, the method comprising:
   removing select material from the servicing location of the outer engine casing such that a replacement support ring not having a forward hook can be installed in the servicing location in the place of the aged support ring; and
   installing the replacement support ring not having a forward hook in the servicing location comprising securing an aft hook of the replacement support to the outer casing, wherein the aft hook supports the support ring from the outer engine casing, the replacement support ring including a strong back plate spanning between forward and aft walls of the replacement support ring, the strong back plate adapted to effect a reduction in dynamic displacement between the forward and aft walls during operation of the engine, wherein the strong back plate includes a plurality of circumferentially spaced apart corrugations spanning between the forward and aft walls of the support ring from a forward edge of the strong back plate to an aft edge of the strong back plate, the corrugations extending radially toward the main body portion and increasing a structural rigidity of the strong back plate in the axial direction while providing controlled displacement in the radial direction to reduce stress;
   wherein a radially inwardly facing surface of an aft flange extending axially from the aft hook is the sole structure of the support ring that is supported by a radially outwardly facing surface of structure of the outer engine casing or structure affixed to the outer engine casing.

9. The method of claim 8, wherein removing select material from the servicing location of the outer engine casing comprises removing select material from the servicing location such that the outer engine casing has a generally radially extending and axially facing wall surface with no slot or groove at the servicing location.

10. The method of claim 9, wherein the radially extending and axially facing wall surface of the outer engine casing at the servicing location after the select material is removed from the engine casing is axially spaced from a radially extending and axially facing wall surface of the outer engine casing at the servicing location before the select material is removed from the outer engine casing.

11. The method of claim 8, further comprising installing a plurality of vanes onto the replacement support ring.

12. The method of claim 8, wherein the vanes installed onto the replacement support ring are vanes that were removed from the aged support ring before the step of removing select material from the servicing location outer engine casing.

13. The method of claim 8, wherein installing the replacement support ring in the servicing location comprises inserting the aft flange of the replacement support ring into a corresponding groove formed in the outer casing.

14. The method of claim 13, wherein inserting the aft flange of the replacement support ring into a corresponding groove formed in the outer casing comprises inserting the radially inwardly facing surface of the aft flange onto a radially outwardly facing surface of the outer engine casing within the groove.

15. The support ring of claim 1, wherein:
   during a cold or non-operational state of the engine, a gap exists between the forward side of the main body portion and an axially facing wall surface of the outer engine casing located immediately upstream from the forward side of the main body portion; and
   during operation of the engine, at least one of: thermal growth of at least one of the support ring and the outer engine casing; and relative movement between the support ring and the outer engine casing causes the gap to shrink and be depleted.

* * * * *